United States Patent Office 2,805,953
Patented Sept. 10, 1957

2,805,953
ANTI-SKINNING AGENT FOR VARNISH-TYPE COATINGS AND JOINT SEALING COMPOUNDS

Richard B. Hirsch, Cleveland Heights, Ohio, assignor to The Federal Process Company, Cleveland, Ohio, a corporation of Ohio No Drawing. Application June 6, 1955,
Serial No. 513,612

1 Claim. (Cl. 106—241)

The invention relates to a method and means for the prevention of skin formation on varnish-type compounds or joint sealing compounds which are obtainable in liquid or viscous form, and which are exposed to the air prior to or during use, or which may be covered again and laid aside in a partially filled container for periods varying in length.

The invention is particularly applicable to the prevention of skinning in coatings of the nature described in U. S. Letters Patent No. 2,140,657, granted December 20, 1938 to Mortimer I. Strauss. Briefly, the invention there described relates to a varnish coating in which the resinous base is shellac, in an alcohol-type solvent, and in which the dried coating retains its elasticity even though subjected to elevated temperatures. The novel method disclosed and claimed in said patent comprises ageing a mixture of shellac, from which alkali insoluble material has been removed, with a bodying or pigmentation material, and sufficient alcohol to form a mass of syrup-like consistency, said ageing being carried on for an extended period of time, after which the material is agitated to produce suspended particles of impurities, and finally the varnish is passed through a comparatively fine mesh screen to remove the particles. The elasticity and smoothness of coatings applied by the use of this product are greatly improved. While the present invention is particularly applicable to a liquid varnish of this improved type, it may be used to advantage with other shellac-base varnishes, and also with cementitious liquids derived from such varnish.

An object of the invention is to provide a varnish or cementitious liquid which can be exposed to the air in open containers, with little or no tendency to skin formation during the usual working day, or even longer.

A further object of the invention is to provide a varnish-type coating for an adhesive between two parts to be united, which coating remains suitably moist until the union is effected. As will be obvious, skin formation prior to such union impairs the quality of the bond.

Other objects and advantages will be apparent from a study of the following description of an embodiment thereof.

In the making of an adhesive coating from the shellac type varnish described hereinabove, it has been customary to add a solid, inert filling material for example a silicate, such as magnesium silicate, in an amount approximating two and one-half pounds per gallon of varnish, after the modification treatment outlined hereinabove and more fully described in the aforesaid U. S. Patent No. 2,140,657. I have found that when I add from one-quarter pound (¼ lb.) to one and one-half pounds (1½ lbs.) of malic acid, there is a marked improvement in the skinning characteristics of the composition. The greater the tendency of the varnish or cement to form a skin, the larger the amount of malic acid advisable. For normal use about one-quarter pound of malic acid will usually be sufficient. This will retard skin formation for about a complete working day. The higher percentages are advisable in cases of extreme tendencies toward skinning. The example given for preventing skinning in a liquid cement may be used as a guide for skin prevention in the liquid varnish, the advisable amount of malic acid to be added per gallon being the same. The necessity or desirability of variation in the amount of malic acid arises from the fact that the resinous base material is often imported from various sources in backward countries, and before importation it receives preliminary processing by primitive methods.

What I claim is:

A shellac base liquid cement in an alcoholic solvent, containing magnesium silicate as a pigment and filler, having therein from one-quarter pound to one and one-half pounds of malic acid per gallon, and characterized by greatly improved resistance to skinning tendency.

References Cited in the file of this patent

UNITED STATES PATENTS

| | | |
|---|---|---|
| 1,805,458 | Rogers | May 12, 1931 |
| 1,836,265 | McBurney et al. | Dec. 15, 1931 |
| 1,857,274 | Emhardt | May 10, 1932 |
| 1,918,804 | Gardner | July 18, 1933 |
| 2,140,657 | Strauss | Dec. 20, 1938 |